INVENTORS
RENE CHASSOUX
BY JEAN PIERRE CAILLEY

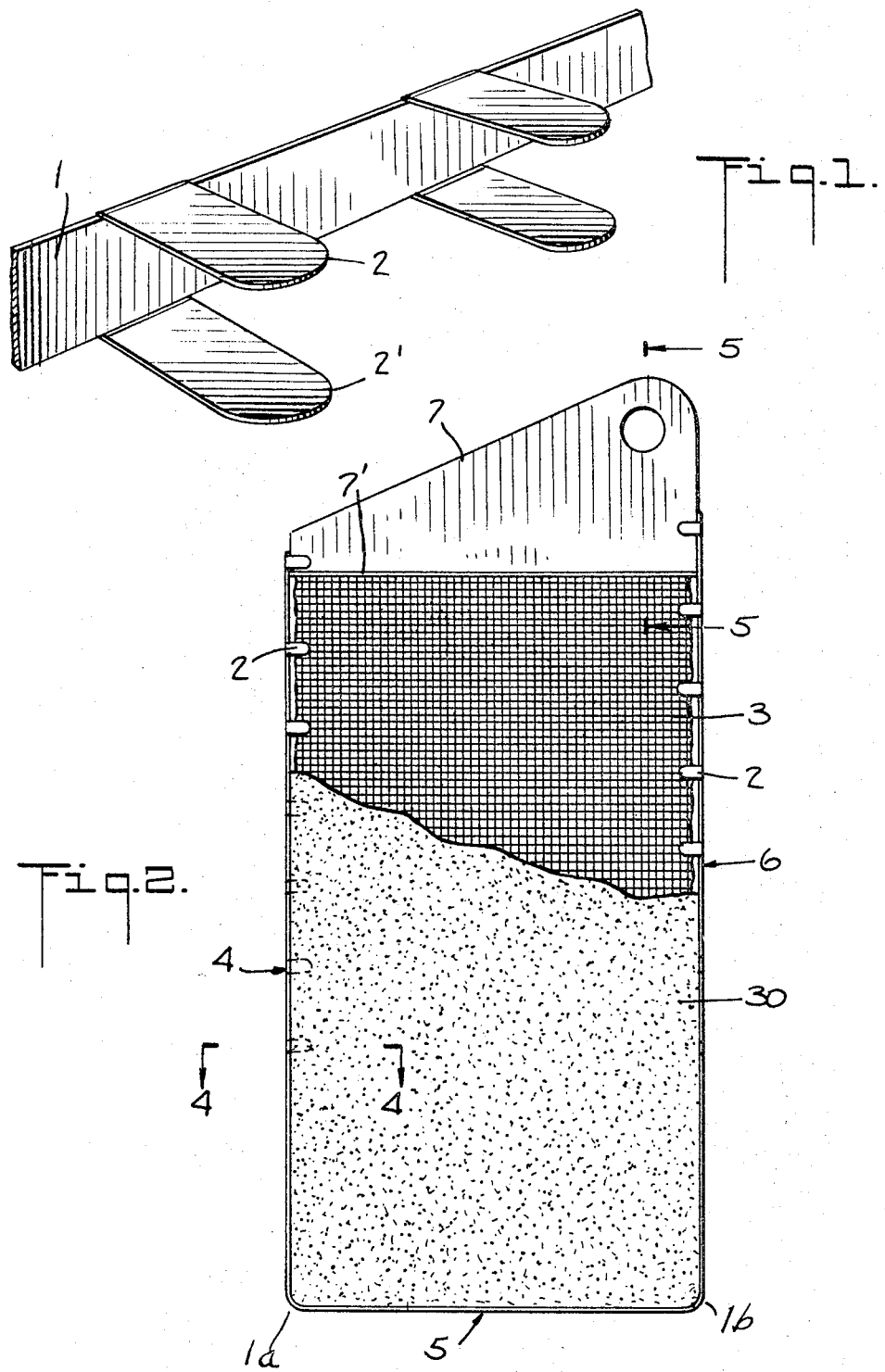

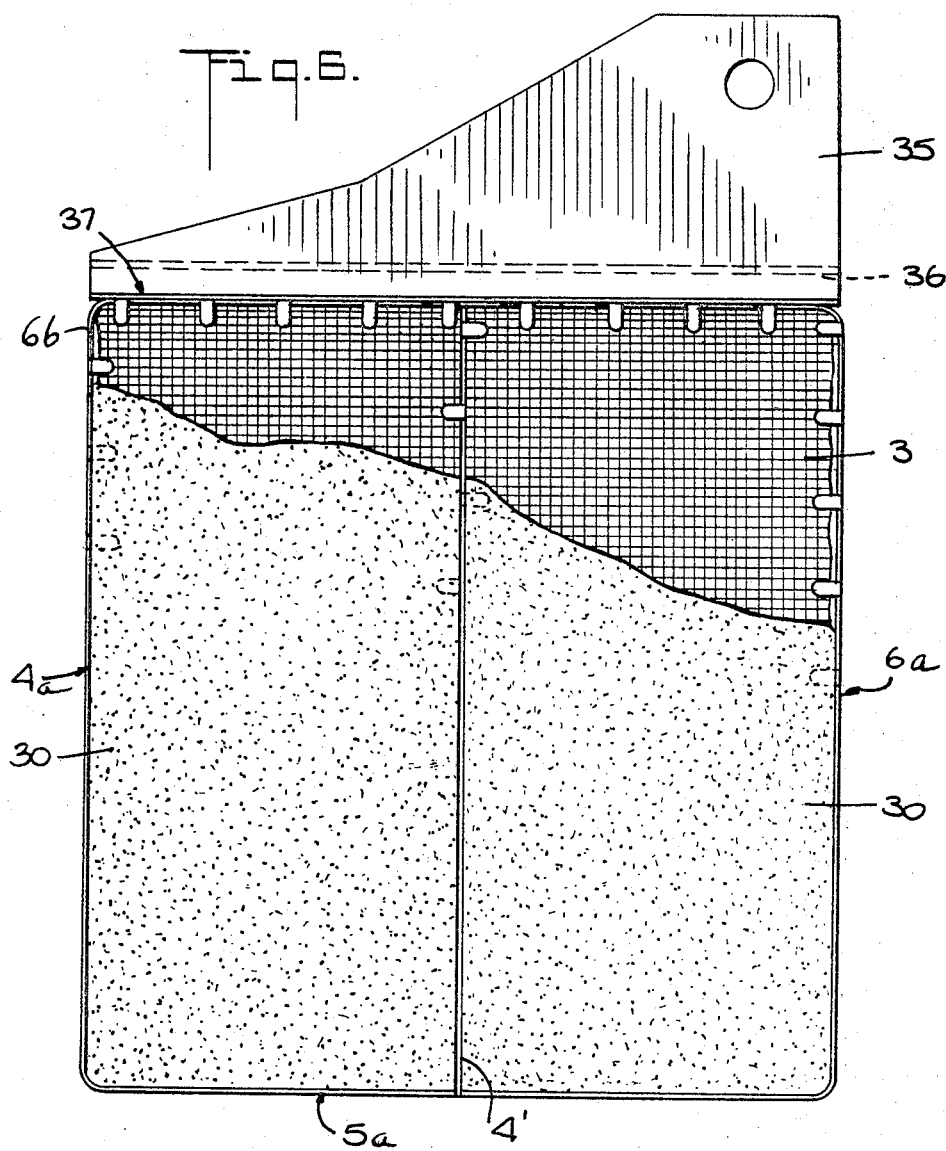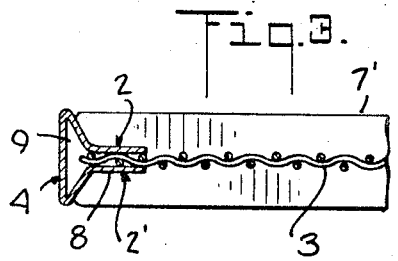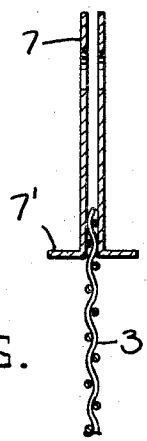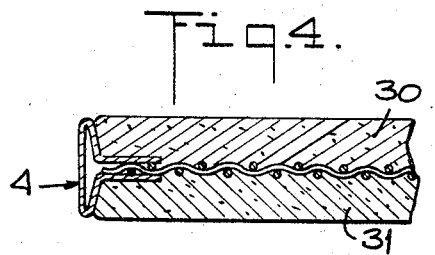

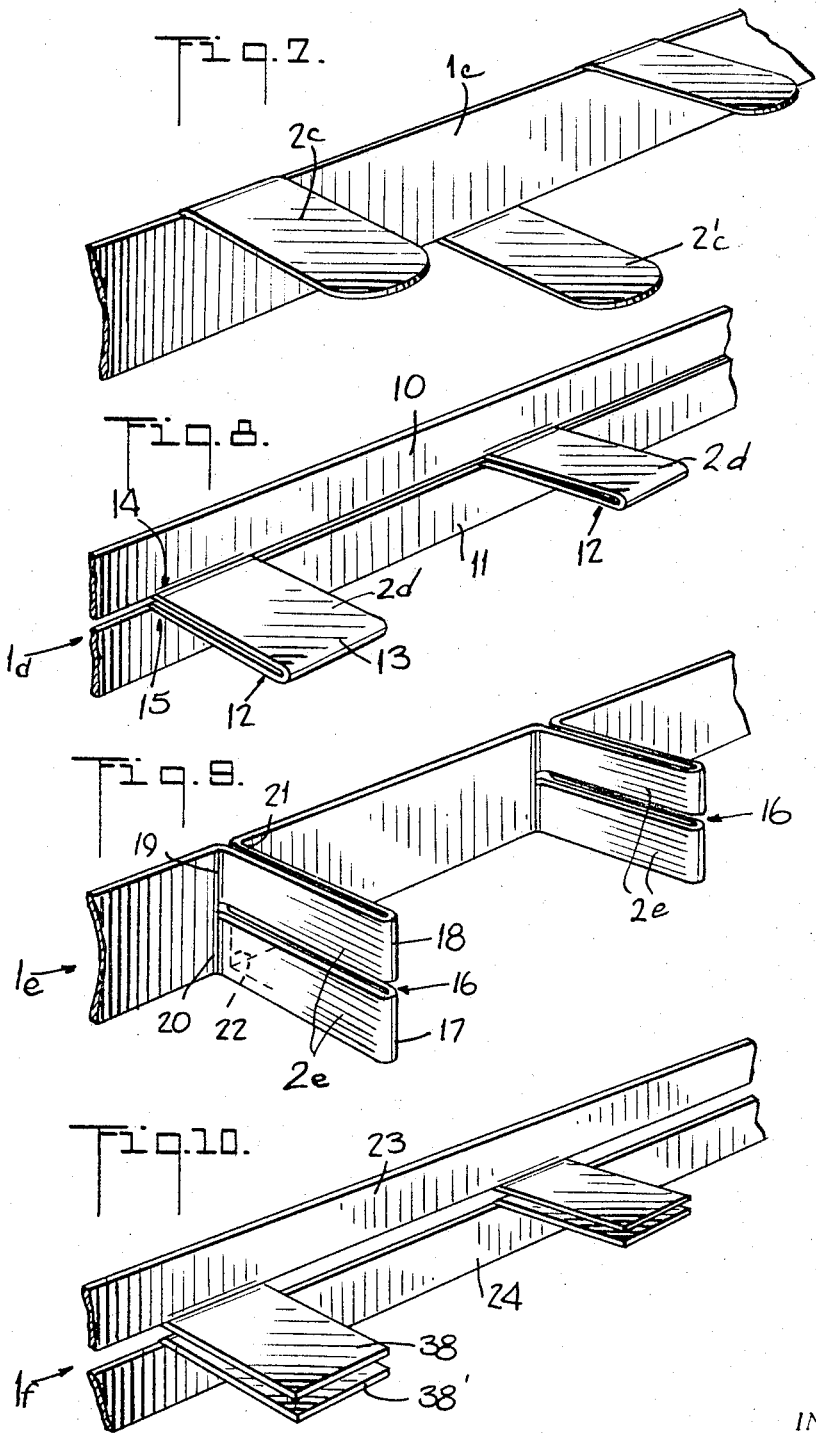

ATTORNEYS

United States Patent Office 3,519,485
Patented July 7, 1970

3,519,485
ELECTRODES FOR ELECTROCHEMICAL GENERATORS
René Chassoux, Talence, and Jean Pierre Cailley, Ambares, France, assignors to Societe des Accumulateurs Fixes et de Traction (Societe Anonyme), Romainville, France, a company of France
Filed July 2, 1968, Ser. No. 742,021
Claims priority, application France, July 5, 1967, 113,228; June 14, 1968, 155,121
Int. Cl. H01m 35/06, 35/20
U.S. Cl. 136—56
21 Claims

ABSTRACT OF THE DISCLOSURE

Electrodes for electrochemical generators such as storage batteries comprising a metal frame in which a perforated sheet such as a grid or screen is fixed to the frame in a mid-plane position with reference to the electrode thickness as by tabs extending from the frame and welded to the perforated sheet to fix its location, the active agglomerated powder electrode material being applied to both faces of the perforated sheet and compressed against said sheet and comingingly interpenetrating the perforations of the said sheet.

BRIEF SUMMARY OF INVENTION

This invention relates to electrodes used in electrochemical generators, such as storage batteries, and mainly comprising a metal frame, a conductive perforated sheet such as a grid or screen, the said sheet being located in the middle plane of the electrodes.

The perforated sheet must:

Provide good mechanical strength to the electrode;

Constitute a conductive system either for distributing the current through the compressed powder material or in collecting it, respectively during charge and discharge.

On the other hand the metal frame itself:

Serves to increase the mechanical strength mainly along the edges of the electrodes, thus preventing electrode active material from shedding due to impacts, vibrations, and the like;

Constitutes the main conductive system for current flow; and

Permits the precise centering of the perforated sheet in the middle plane of the compressed powder material.

It has already been suggested to center a metal screen as a support for the electrode material either by a frame comprising two massive parts or by a one piece frame folded back as a U so that the thickness of the electrode corresponds to the thickness of the said frame.

The main drawbacks of these known structures are the following:

The actual active volume and above all the active surface of the electrode are decreased with respect to the geometrical volume and surface;

The dead weight of the electrode is unduly increased by the use of a massive frame;

The shape of the active material is not definite so that it has not the required dimensional accuracy since batches of the said material can be found on the frame itself; and When a compression step is used for the powder, the extent of compression is checked by the frame so that on the one hand compression is carried out to a constant level and not to a constant pressure; on the other hand, the perforated sheet is frequently sheared along the edge of the frame.

Use of a metal sheet partially centered in the bulk of the electrodes so that the frame may be made of a folded metal sheet has also been suggested.

In such case the screen is only partially centered, and above all the active surface is reduced since the frame is folded back over the edges of the electrodes and reduces the active surface, so that electrochemical reactions cannot take place in certain areas such as those covered by the frame.

Furthermore, with such a frame the shape of the active material cannot be well defined.

The present invention provides among its objects and features ways to overcome the above mentioned drawbacks.

In practice of the invention in order to provide an electrode to be used in electrochemical generators, for example storage batteries, it comprises a metal frame, a conductive perforated sheet such as a metal screen or grid, fixed to the said frame and carrying an agglomerated compressed powder material, the said sheet being located in the middle plane of the electrode thickness, said electrode being particularly remarkable in that the said frame is provided with tabs for welding to the perforated sheet or grid and insuring the correct centered-location of the latter, the said tabs being practically completely buried and concealed in the said agglomerated powder material.

According to an embodiment, the frame is provided with one at least metal blade perpendicular to the perforated sheet or grid and constituting the rims of the electrodes on three at least sides. In addition, the frame can comprise another part used as a plate lug.

With a frame according to this embodiment, the compression is accurately limited to the area situated inside of the blade so that the resulting compression action is uniform over the whole area of the powder material. Moreover, the weight and the volume of such a frame are reduced to their minimum value in the electrode whose active area is in no way concealed or covered because the tabs of the said frame are buried in the compressed agglomerated powder material. Consequently the electrochemical operation absolutely is not hindered by the presence of the frame.

The frame and tabs may be made from one piece by cutting a sheet, for example a steel sheet, that is ultimately nickel plated. Prior to the assembly of the perforated sheet or grid therewith for example by spot-welding, the tabs of the frame can be arranged either subsequently parallel to the plane of the said sheet, or perpendicular to this plane, and, if such latter is the case, a groove is provided in order to hold the said sheet.

When the tabs have been fixed to the perforated sheet, the frame and the tabs constitute a T-shaped assembly, at least on a projection plane.

Other objects and features of the invention will clearly appear from the following description and annexed drawing in which:

FIG. 1 is a perspective view of a portion of the frame according to the invention;

FIG. 2 is an elevational view with a partial breaking away of an electrode according to the invention;

FIG. 3 is a partial cross-section of a frame according to the inevntion after the perforated sheet has been welded thereto but prior to application of the powder to the perforated sheet;

FIG. 4 is a partial cross-section along the line IV—IV of FIG. 2;

FIG. 5 is a partial cross-section along the line V—V of FIG. 2 showing as an embodiment, a plate-lug-perforated sheet assembly;

FIG. 6 shows similarly to FIG. 2 another embodiment of the invention;

Figure 11:
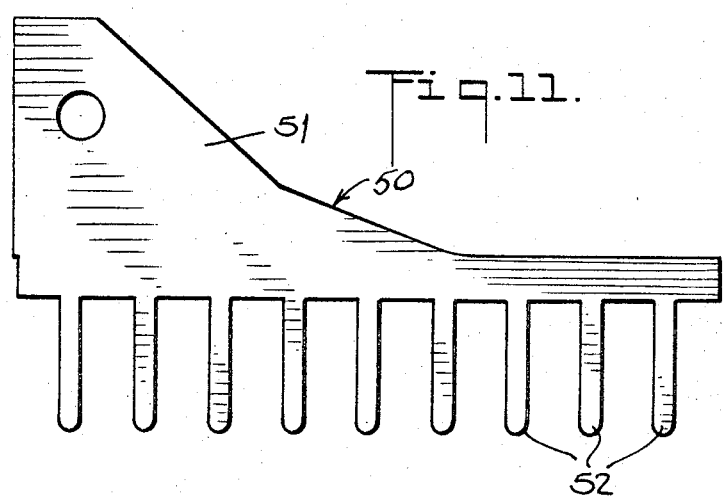
Figure 12:
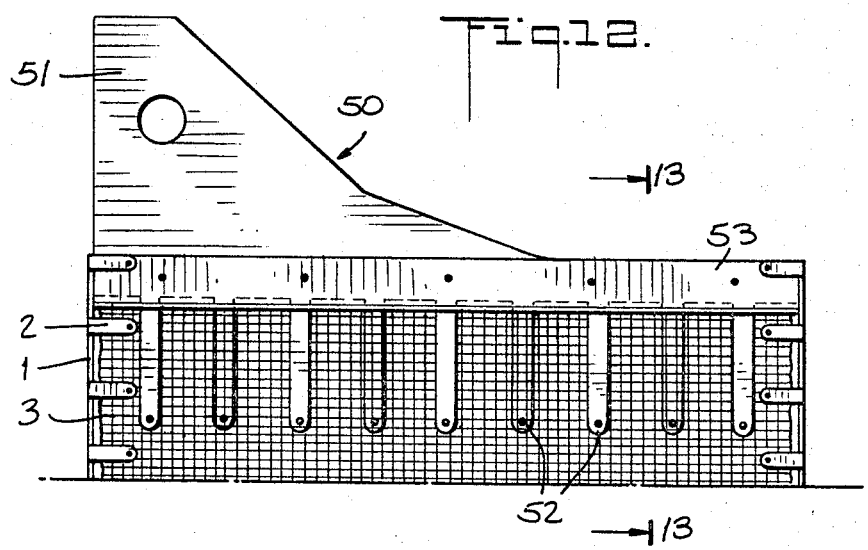
Figure 13:
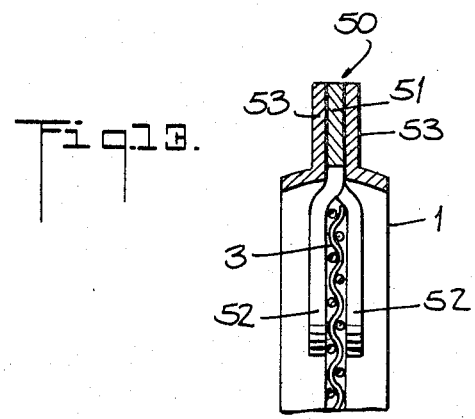

FIGS. 7, 8, 9 and 10 similar to FIG. 1 show modified shapes of the frame;

FIG. 11 is a front view of a part of a plate lug according to the invention;

FIG. 12 is a partial vertical view of an electrode provided with a plate lug such as shown in FIG. 11 without the powder material applied; and FIG. 13 is a cross-section along the line of VI—VI of FIG. 12.

DETAILED DESCRIPTION

Referring to the drawings and first to FIGS. 1–6, FIG. 1 shows a portion of a metal frame for an electrode according to the invention, comprising a metal blade 1 along which are regularly distributed pairs of tabs 2 and 2' which are folded to form U-shaped portions in which will be lodged the conductive perforated sheet 3 constituted by a metal grid for example, as shown in FIGS. 2, 3, 4, 5, 6, 12 and 13.

As shown in FIG. 2, the blade 1 itself is folded 90° twice at 1a and 1b to form three sides 4, 5 and 6 of the electrode. The fourth side is formed as by the plate lug 7 which can be constituted, as shown in FIG. 5, by two metal sheets symmetrically located with respect to the middle plane of the electrode in order to ensure at this place also the location of the grid 3 in said middle plane. The two said plate lug sheets are welded together and to the upper end edge of the grid 3. Each metal sheet of the plate lug 7 is provided with a lateral rim such as 7' which serve the same frame function as the blade 1. The tabs 2 and 2' are further folded towards each other after insertion of the screen 3 and the assembly is welded, preferably electrically as at the points 8 where the tabs are in contact with the screen 3. Thus, the latter is practically fixed and centered in the middle of the frame width as shown in FIG. 3, and the so welded assembly cannot warp. The frame and the screen are then laid over a first layer 31 of powder material containing the active material, for example such as that described in U.S. Pats. 2,643,276, 2,683,181 and 2,683,182, filed by the instant assignee. A second similar layer 30 is placed on the other side of the grid and the assembly is compressed. The result in shown in FIG. 4.

As can be seen by comparing FIGS. 3 and 4, the compression has also substantially reduced the empty space or voids 9 initially existing between the blade 1 and the tabs 2 and 2' so that as an advantageous result the screen 3 becomes stretched, so eliminating all irregulaties occasionally due to the use of screens whose sizes and shapes cannot be mechanically determined with complete accuracy.

The porous material of the electrodes penetrates the perforations of the screen and merges on both sides of the screen through which it passes, so that the porous material medium is continuous and contributes also to the mechanical strength of the electrodes.

The sides 4, 5 and 6 of the frame can obviously be made independently and then welded separately to the screen. The welding operation can also be automatically and continuously carried out by welding an undefined length of the screen having a width corresponding to that of the electrode and frame sides 4 and 6 of the indefinite length. The frame-screen assembly will then be obtained for one electrode by cutting off a suitable length, and welding a further side 5 and a lug 7 thereto along free edges at lines of severance.

In the above described example, in FIG. 2, the blade has been folded at 1a and 1b to constitute the three sides of the electrode. According to a modified form of the invention as shown in FIG. 6, the screen or grid 3 can be made in two parts one secured to the side 4a and bottom 5a and top 6a the other to side 6a and bottom 5a and top 6b, a cross-bar 4' also is comprised in the closed frame so that stiffness is increased. The cross-bar 4' is constituted by a blade similar to the blade 1, the pairs of tabs 2b and 2'b being alternatively folded on either side of the said blade width of bar 4'.

In this case, the plate lug 7 of FIG. 2 is not used to center the screen 3; it instead is constituted by a mere metal sheet 35 with a base folded laterally at 90° to a height equal to the width of the top 6b of blade 1a onto which it is welded, resulting in an outer edge 37; the sheet 35 can be provided with a groove 36 in order to improve its flexibility.

FIG. 7 illustrates an embodiment in which the blade 1c is not provided with aligned symmetrical tabs 2c and 2'c at the same level, but only single tabs are located in staggered realtionship to be alternatively placed over and under the perforated sheet when folded onto the said sheet.

FIG. 8 shows another embodiment where the metal blade 1d comprises two elementary alike blades 10 and 11, connected through bridges such as 12 folded through 180° at 13 and at 90° at 14 and 15, the said folded bridges becoming tabs 2d.

Then said tabs 2d are alternatively slightly bent up and down from their middle position to make easier the insertion of the screen 3 in a weaving manner perpendicularly to the blade 1d with tabs 2d alternately on opposite sides of said screen. Then the tabs 2d are bent back and spot-welded to the screen.

FIG. 9 shows another embodiment in which the middle section of the blade 1e is provided with longitudinal slits such as 16, the portions of the blade including said slits being folded at 180° at the regions 17 and 18 corresponding to the middle of said slits and at 90° at the regions 19, 20 and 21, 22 corresponding to the ends of the slits.

The width of the slits 16 corresponds to the thickness of the perforated sheet which can then be inserted into them and welded perpendicularly to the blade 1. In this embodiment, the tabs 2e are obtained by folding at 180° the slitted blade 1e.

FIG. 10 shows another embodiment in which the blade 1f is constituted by two identical elementary blades 23 and 24 having tabs such as 38 and 38' at regular intervals, folded at 90° with respect to the blades 23 and 24, and facing each other. The said tabs are spot-welded to it when the perforated sheet 3 is inserted between them.

In FIGS. 11, 12 and 13, the plate lug 50 is essentially constituted by a metal sheet 51 provided with tabs 52 that are to be welded to the screen 3 carrying the compressed powder material.

As shown in FIG. 11, the metal sheet 51 of the plate lug and the tabs 52 are integral parts of a same piece and are cut from the same sheet for example a steel sheet.

When the screen 3 is assembled therewith, the tabs 52 are arranged alternatively on either side of the said screen, as shown in FIG. 12.

In FIG. 13, the edge having the tabs 52 of the sheet 51 is placed all over its length between two small bars 53 each having a substantially L-shape cross-section. The bars 53, cut off from a metal sheet, for example steel sheet, can be fixed to the sheet 51 by spot welding. They are placed in such a way that along the edge of the sheet 51 having the tabs 52, the plate lug 50 has a substantially T-shape cross-section, the stroke of the said T having a length substantially equal to the thickness of the compressed powder material which will be laid over the screen 3. The other portions of the frame are constituted by a metal blade 1 having tabs 2, similar to that shown in FIG. 1, the width of the blade 1 being substantially equal to the length of the stroke of the said T. The tabs 52 are spot welded to the screen 3. Since the stresses in an electrode are greater at the proximity of the plate lug, the length of the tabs 52 will advantageously be greater than that of the tabs 2 provided on the blade 1.

As shown in FIG. 12, the ends of the blade 1 are also fixed to the plate lug by welding end located tabs 2 onto the said lug 50.

While specific embodiments of the invention have been described and shown, variations within the scope of the appended claims are possible and are contemplated. There is no intention therefore of limitation to the exact abstract or disclosure hereinabove presented.

What is claimed is:

1. Electrode for electrochemical generators such as storage batteries, comprising a metal frame, a conductive perforated sheet fixed to the said frame, an agglomerated powder material carried by said sheet, the said sheet being located in the middle plane of the electrode, means provided on the frame and secured to the perforated sheet to ensure its correct location in the frame, said means being practically completely buried in said agglomerated powder material, and said frame comprising at least one metal blade perpendicular to the perforated sheet serving as the major portion of the border of said electrode, and wherein said means comprise tabs provided on the frame blade that are, at least partially, substantially parallel to the plane of said perforated sheet.

2. Electrode according to claim 1 wherein said means comprise tabs provided on the frame blade that are perpendicular to the plane of the perforated sheet and define a groove into which the said sheet is inserted.

3. Electrode according to claim 1 wherein said tabs are fixed to said sheet and wherein the frame blade and tabs after the said tabs have been fixed to the perforated sheet have a substantially T shape, at least on a projection plane.

4. Electrode according to claim 1 wherein the tabs are located alternatively, in staggered condition, on either side of the perforated sheet.

5. Electrode according to claim 1 wherein in addition, the frame comprises another part serving as a conductive perforated sheet plate-lug.

6. Electrode according to claim 1 wherein said tabs are provided on the frame blade at regular intervals, and folded at 90° with respect to the said blade.

7. Electrode according to claim 6 wherein the blade comprises two identical elementary blade elements connected through bridges perpendicular to the said elementary blade elements, the said bridges forming tabs.

8. Electrode according to claim 6 wherein the blade is provided with tabs folded towards each other, to make a U.

9. Electrode according to claim 2 wherein the tabs are constituted by 180° folds of the blade.

10. Electrode according to claim 1 wherein the blade comprises two identical elementary blades having tabs at regular intervals extending at 90° with respect to elementary blades, the tabs of an elementary blade facing the tabs of the other elementary blade, and wherein the perforated sheet is located between the tabs that face each other.

11. Electrode according to claim 5 wherein the plate-lug comprises two metal sheets symmetrical with respect to the middle plane of the electrode, welded together and to the edge of said perforated sheet, the said metal sheets being provided with a rib on an edge thereof abutting the perforated sheet.

12. Electrode according to claim 1 wherein the frame is provided with at least one cross-bar in the form of a metal blade having tabs.

13. Electrode according to claim 5 wherein the plate lug of the frame is mainly constituted as a thin metal plate provided with tabs that are welded onto the conductive perforated sheet.

14. Electrode according to claim 13 wherein the thin metal plate and the tabs are of one piece.

15. Electrode according to claim 13 wherein the tabs on the plate lug are located alternatively on opposite sides of the conductive perforated sheet.

16. Electrode according to claim 13 wherein the tabs on the plate lug have a length greater than that of tabs on the other parts of the frame.

17. Electrodes according to claim 13 wherein an edge provided with the tabs of the plate lug is situated on its full length between two small bars having an L shape cross-section and fixed to the said lug so that the plate lug has a T shape cross-section all along the said edge.

18. Electrode according to claim 17 wherein the length of the stroke of the said T is substantially equal to the thickness of compressed powder material of the electrode.

19. Electrode according to claim 2 wherein said tabs are fixed to said perforated sheet and wherein the frame blade and tabs after said tabs have been fixed to the perforated sheet have a substantially T-shape, at least on a projection plane.

20. Electrode according to claim 1 wherein the frame and said means are integral.

21. Electrode for electrochemical generators such as storage batteries comprising a conductive perforate sheet, a metal frame having a blade portion substantially perpendicular to the said sheet and whose overall width defines the thickness of said electrode, means secured to and extending from said blade portion and secured to said sheet to support the latter in a centralized location of said frame at the mid-plane of the electrode, agglomerate powder material covering both faces of said perforate sheet and intermingled via perforations of said sheet, the overall thickness of said agglomerate powder material being equal to the overall width of said blade portion, said means being substantially completely buried by said agglomerate powder material and being integral with said blade portion and extending perpendicularly thereto, and said blade portion constituting a major portion of the peripheral border of the electrode without however covering any outer planar surfaces of said agglomerate powder material.

References Cited

UNITED STATES PATENTS

| | | | |
|---|---|---|---|
| 1,982,485 | 11/1934 | Salmon et al. | 136—36 |
| 2,909,586 | 10/1959 | Hagspihl | 136—28 |
| 3,180,761 | 4/1965 | Horn et al. | 136—51 |

WINSTON A. DOUGLAS, Primary Examiner

A. SKAPARS, Assistant Examiner

U.S. Cl. X.R.

136—68, 120